United States Patent
Hanna et al.

(10) Patent No.: US 10,459,496 B2
(45) Date of Patent: Oct. 29, 2019

(54) MODULAR COMPUTER SYSTEM WITH FLEXIBLE STRUCTURE

(71) Applicants: Magdi Hanna, Gilbert, AZ (US); David Mason, Phoenix, AZ (US)

(72) Inventors: Magdi Hanna, Gilbert, AZ (US); David Mason, Phoenix, AZ (US)

( * ) Notice: Subject to any disclaimer, the term of this patent is extended or adjusted under 35 U.S.C. 154(b) by 170 days.

(21) Appl. No.: 15/368,461

(22) Filed: Dec. 2, 2016

(65) Prior Publication Data

US 2018/0157294 A1    Jun. 7, 2018

(51) Int. Cl.
*G06F 1/18*    (2006.01)
*H01R 12/70*   (2011.01)

(52) U.S. Cl.
CPC .............. *G06F 1/184* (2013.01); *G06F 1/181* (2013.01); *G06F 1/187* (2013.01); *H01R 12/7076* (2013.01)

(58) Field of Classification Search
CPC .......... G06F 1/184; G06F 1/181; G06F 1/187; H01R 12/7076
See application file for complete search history.

(56) References Cited

U.S. PATENT DOCUMENTS

| | | | | |
|---|---|---|---|---|
| 5,963,431 A * | 10/1999 | Stancil | ............... | G06F 1/184 361/785 |
| 6,176,001 B1 * | 1/2001 | Boe | ............... | G06F 1/184 24/563 |
| 6,621,709 B1 * | 9/2003 | Schnabel | ............... | G06F 1/184 361/679.01 |
| 7,393,247 B1 * | 7/2008 | Yu | ............... | G06F 13/409 439/638 |
| 8,902,579 B1 * | 12/2014 | Lalouette | ............... | G06F 1/187 361/679.33 |
| 2003/0016494 A1 * | 1/2003 | Chen | ............... | G06F 1/181 361/679.39 |
| 2011/0090633 A1 * | 4/2011 | Rabinovitz | ............... | G06F 1/184 361/679.31 |

* cited by examiner

*Primary Examiner* — Jayprakash N Gandhi
*Assistant Examiner* — Hung Q Dang
(74) *Attorney, Agent, or Firm* — Morgan Law Offices, PLC

(57) ABSTRACT

A modular computer system, comprises a casing, wherein the casing is an enclosed structure having an exterior and an interior; at least one slide groove, wherein the slide groove is integrated into the interior of the casing; a motherboard, wherein the motherboard is secured within the at least one slide groove; an opening in the exterior permitting a hard drive to be inserted through the opening so that the hard drive extends into the interior and electrically connects it with the motherboard via a Serial ATA (SATA) connector positioned to permit the connection; and a power supply electrically connected to the motherboard. The at least one slide groove permits the motherboard to slide out from the interior during servicing.

8 Claims, 10 Drawing Sheets

MODULAR COMPUTER SYSTEM WITH FLEXIBLE STRUCTURE

BACKGROUND OF THE INVENTION

1. Field of the Invention

The present invention relates to a modular computer system with a flexible structure.

2. Description of the Related Art

Conventional personal computer systems house an assortment of components that are not easily removable for service or upgrading. This format means that it is difficult for a user or even a technician to replace most components, because replacing a component typically requires dismantling it from other components, such as the motherboard. Furthermore, often it is hard to reach or remove a component, such as the CPU or a hard drive. Servicing most computer systems usually requires multiple tedious steps that are beyond the abilities of many people.

As a result of the conventional hardware architecture, many users discard a computer system for problems that could be corrected, such as when a hard drive crashes or the power supply malfunctions. Additionally, many users continue to use outdated computers that are slow and frustrating to operate even though upgrading the system would solve many of the problems encountered.

SUMMARY OF THE INVENTION

According to one aspect of the invention, a modular computer system, comprises a casing, wherein the casing is an enclosed structure having an exterior and an interior; at least one slide groove, wherein the slide groove is integrated into the interior of the casing; a motherboard, wherein the motherboard is secured within the at least one slide groove; an opening in the exterior permitting a hard drive to be inserted through the opening so that the hard drive extends into the interior and electrically connects it with the motherboard via a Serial ATA (SATA) connector positioned to permit the connection; and a power supply electrically connected to the motherboard. The at least one slide groove permits the motherboard to slide out from the interior during servicing.

DETAILED DESCRIPTION OF THE INVENTION

Figure 1:
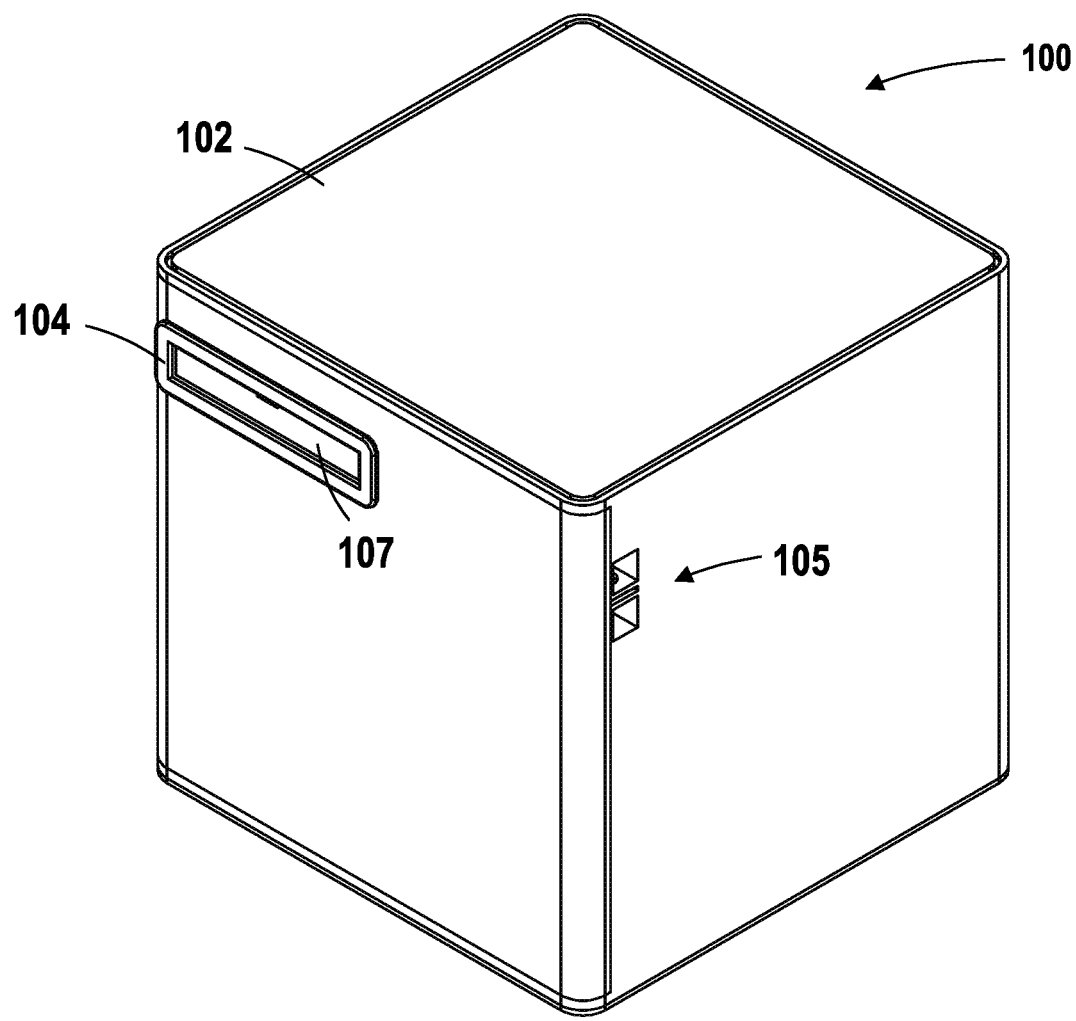
FIG. 1 illustrates an external view of a modular computer system, in accordance with an embodiment of the present invention.

Referring to FIG. 1, a perspective external view of a modular computer system 100, according to an embodiment, is illustrated. As shown, the external elements of the modular computer system 100 comprise a casing 102, a hard drive tray 104 (hereinafter "tray"), and a power switch 105. The casing 102 is designed to protect all of the internal elements of the modular computer system 100. The casing 102 can be constructed of, but is not limited to, a metal, plastic, or composite material preferably provided the material protects the internal elements from electric shock, moisture, and external impact. The casing 102 has an opening 108 (see FIG. 6) sized to fit the tray 104. The location of the opening 108 is dependent upon the arrangement of the internal components and is not limited to the location shown in the figure. The tray 104 includes an aperture 107 sized to receive a hard drive. In one embodiment, the casing 102 has a hinged front door (shown in FIG. 6). In other embodiments, the casing 102 instead has a sliding door, a removable panel, or other means that would allow a user to gain access to the internal components. It is to be understood that although the casing 102 shown herein is illustrated as a cube, the casing 102 could assume another shape. Additionally, it is to be understood that other features such as an electrical cord and various input/output ports (USB, audio jacks, etc.) could also be included in the design.

Figure 2:
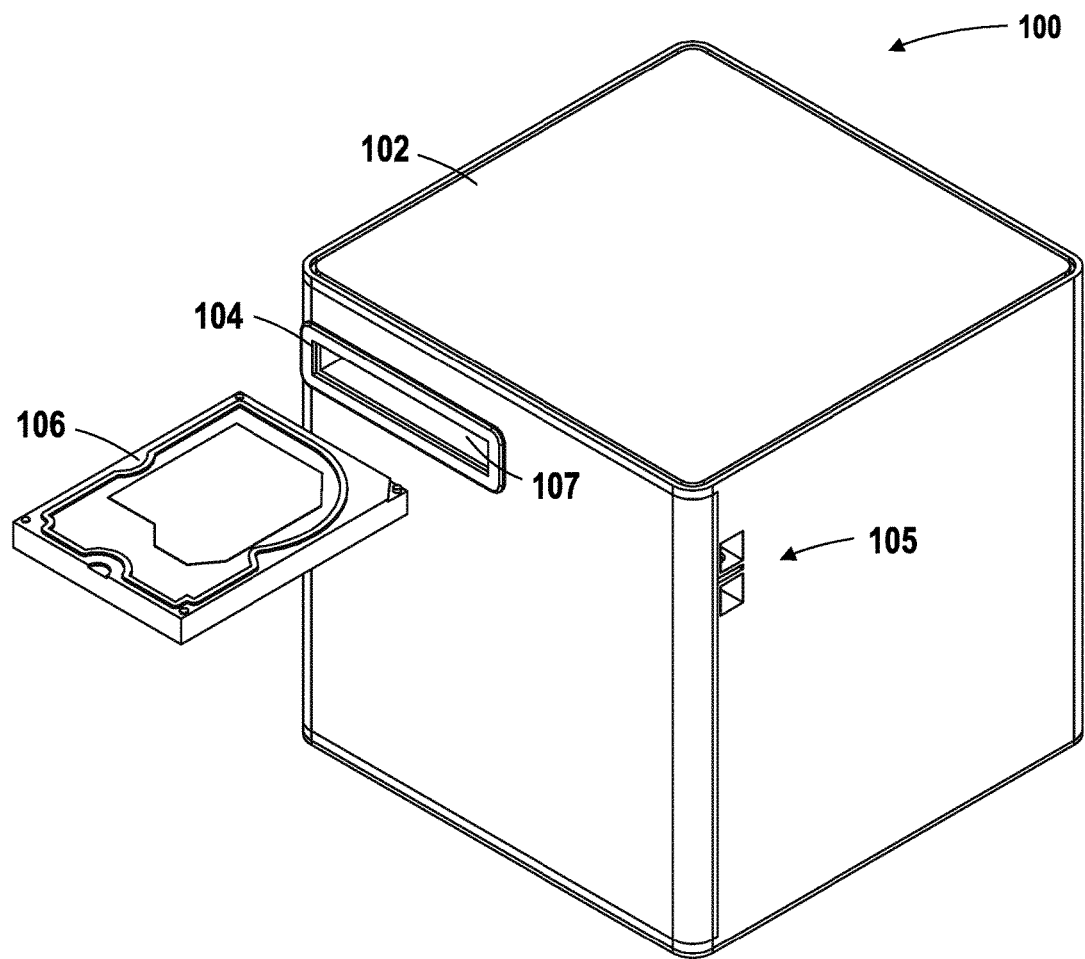
FIGS. 2 to 3 illustrate an external view of the modular computer system of FIG. 1 with a hard drive installed.
Figure 3:
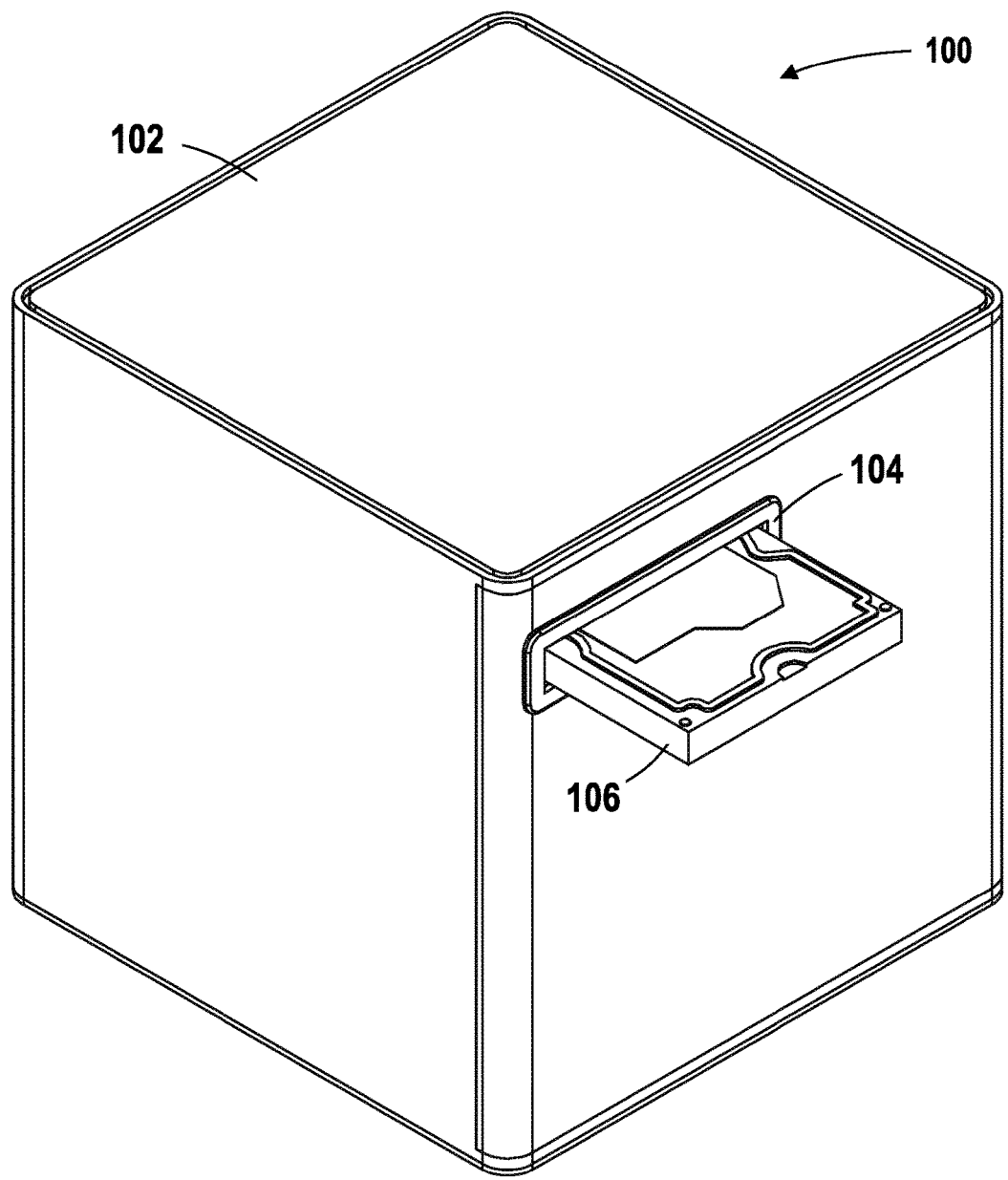

Referring to FIG. 2, an exploded view in which a hard drive 106 is shown pulled out of the tray 104 is illustrated. FIG. 3 illustrates the hard drive 106 inserted into the tray 104. The tray 104 is structured so as to support the hard drive 106 and allow the hard drive 106 to be slid through aperture 107 of the tray 104 such that electrical connectors of the hard drive 106 are ultimately accessible to complementary connectors disposed in the interior of the device, e.g., a Serial ATA (SATA) connector, as will be described in greater detail. The tray 104 can be made from the same material as the case 100, or can be made from another suitable material. For instance, the tray 104 can be constructed from polyethylene, high-density polyethylene, polypropylene, and the like. In one embodiment, the casing 102 has padding to help support the hard drive 104 from damage as well as to suppress vibration. In some embodiments, the tray 104 may have a coating to help secure the hard drive 106 in place. The tray 104 has an aperture 107 to receive the hard drive 106. This aperture 107 can be sized to securely fit different sizes and types of hard drives 106. Additionally, because of the possibility that the hard drive 106 could be removed without proper consent or while it is still in use, which could damage the hard drive 106, in some embodiments, the tray 104 or the interior of casing 102 includes a lock, or other securing means, to prevent removal of the hard drive 106 after it is installed. The lock can be a key type lock, a panel lock, or the like, for example.

Figure 4:
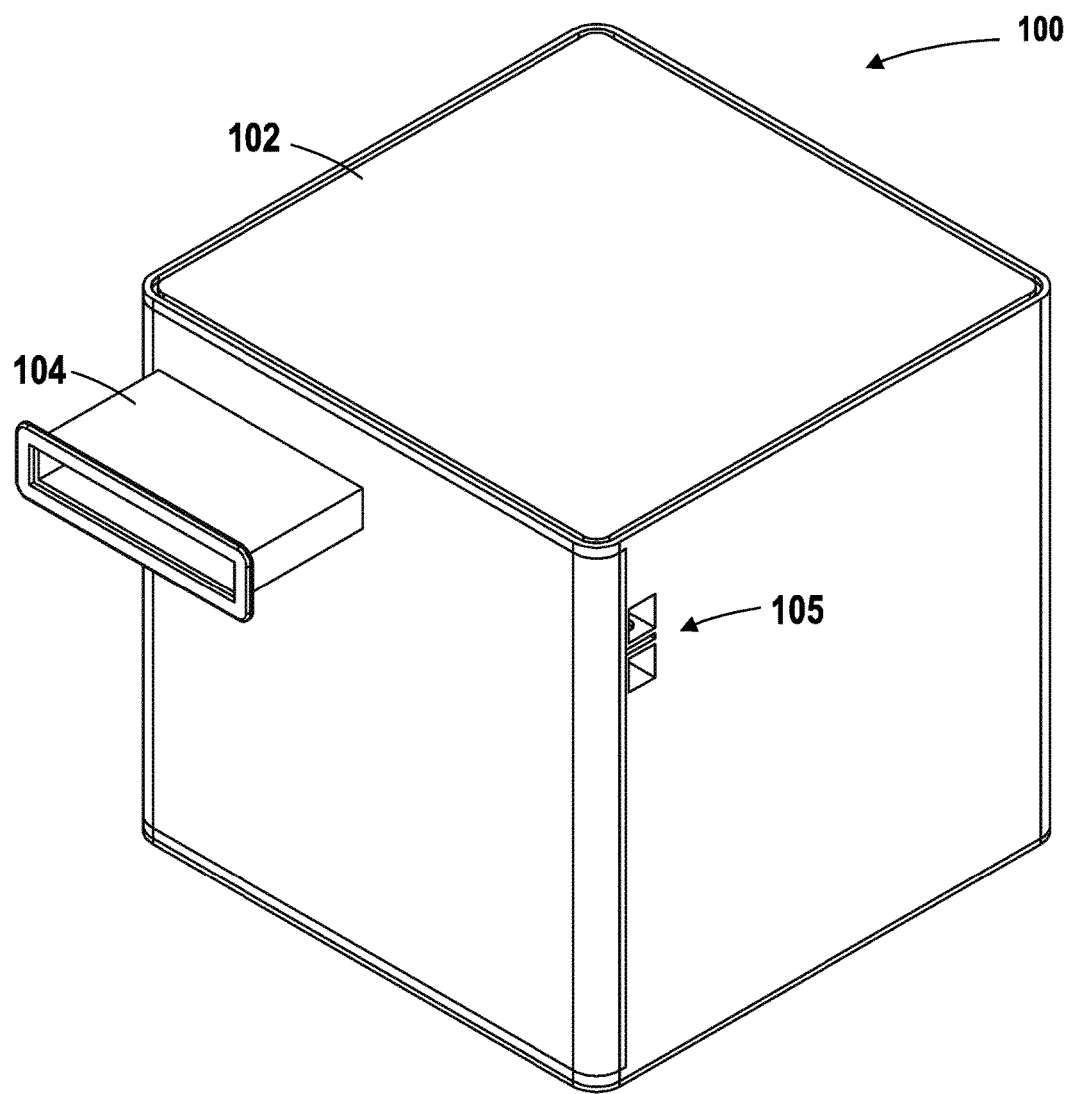
FIG. 4 illustrates an external view of the modular computer system of FIG. 1, with the hard drive tray removed.

FIG. 4 illustrates an exploded view in which the tray 104 is removed from the casing 102.

Figure 5:
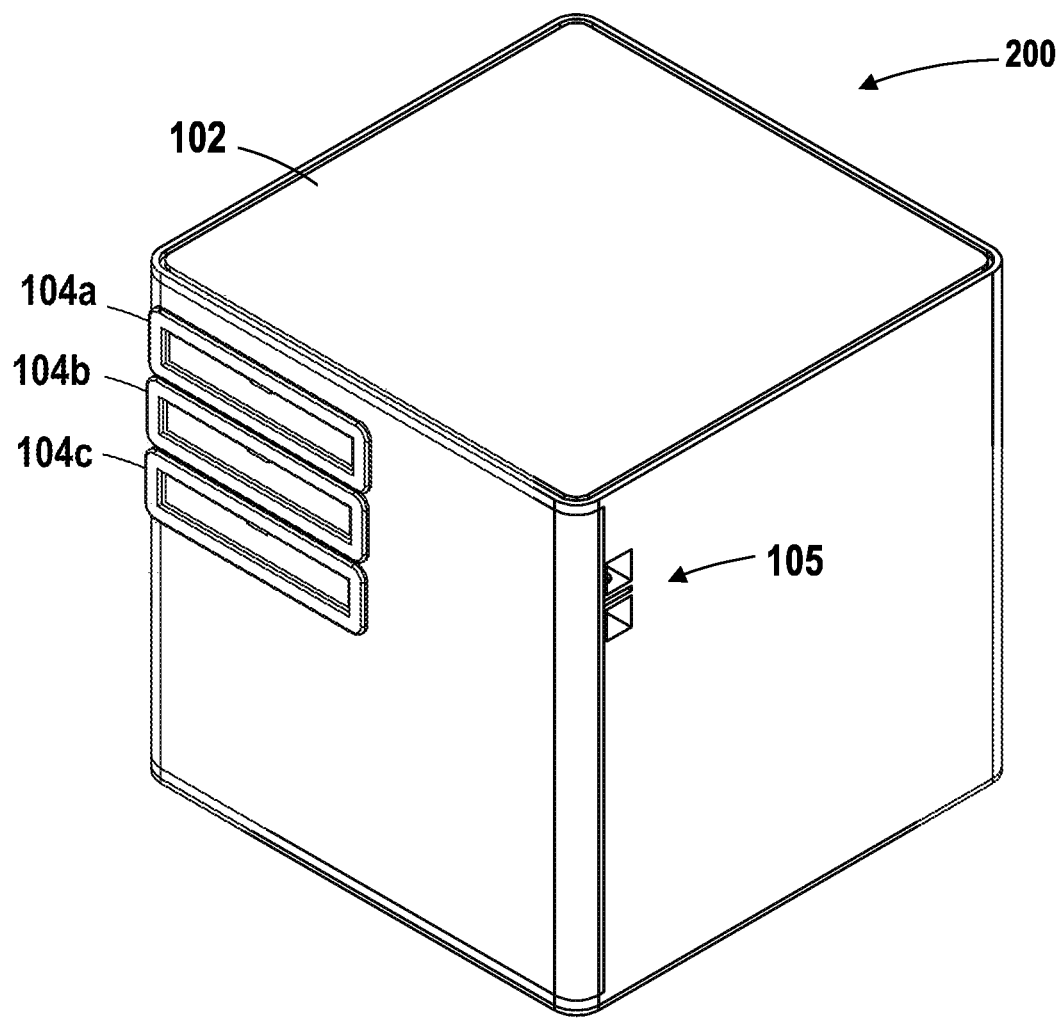
FIG. 5 illustrates an external view of the modular computer system having multiple hard drive trays, in accordance with another embodiment of the present invention.

FIG. 5 illustrates another embodiment of the present invention. As shown, a modular computer system 200 includes multiple trays 104a-c. In this embodiment, each hard drive 106 is inserted into a respective tray 104a-c. It is to be understood that the trays 104a-c could be sized differently from the illustrated embodiment. Having multiple hard drives is a particularly useful feature for backup or additional storage requirements. It is to be understood that the modular computer system 200 is substantially similar to the modular computer system 100 in other respects.

Figure 6:
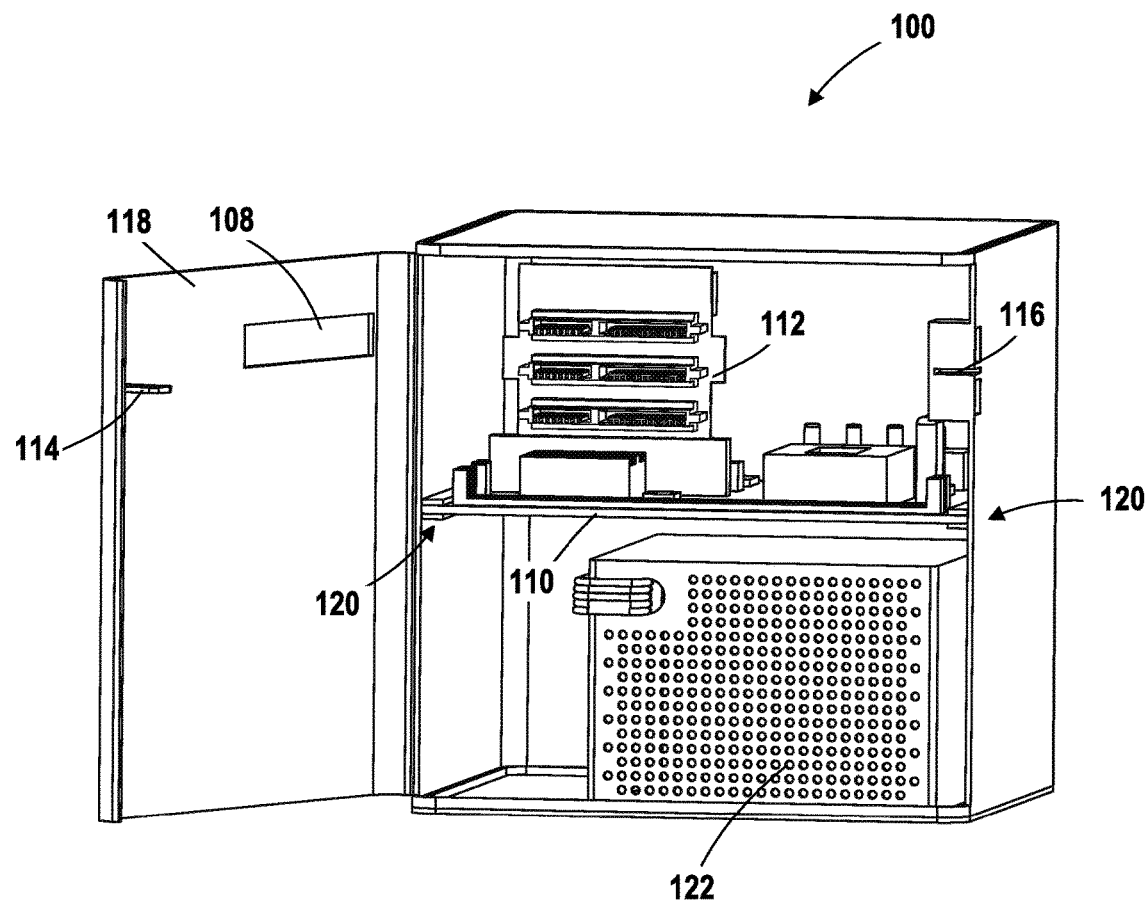
FIG. 6 illustrates a front view of the modular computer system of FIG. 1 with the door open exposing the interior, in accordance with an embodiment of the present invention.

FIG. 6 illustrates a front view of the modular computer system 100 with the door 118 open exposing the interior, in accordance with an embodiment of the present invention. As shown, the door 118 is formed from a front panel of the casing 102 including a hinge permitting the door 118 to swing open. In the shown embodiment, the door 118 has a locking tab 114, which mates with a locking receiver 116. In other embodiments, the method of locking the door 118 can be, but is not limited to, a lock and key, a snap, a clasp, or the like. In the shown embodiment, the opening 108 is shown on the door 118. As mentioned, the opening 108 is where the tray 104 is slid into and secured. The opening 108 can be of various sizes and positions along the door 118 or other portions of the casing 102 based on the setup of the motherboard 110, the backplane 112, and various other components required for the system to operate.

As illustrated, each of the major components is provided as a modular, easily accessible component. In particular, the motherboard 110 is arranged so as to be slid in and out of the interior of the casing 102. Sliding grooves 120 are provided to keep the motherboard 110 stationary without the use of screws or other fasteners, but allow the motherboard 110 to be slid out when necessary. This will be explained in greater detail below. In the illustrated embodiment, a power supply 122 is disposed underneath the motherboard 122 in a separate area permitting easy access to and removal of the power supply 122. However, in other embodiments, the power supply 122 could be disposed elsewhere in the interior. Finally, the backplane 112 is separated from the motherboard 110 and oriented so that the hard disk 106 can electrically connect with a respective connector of the backplane 112 when inserted through an appropriate tray 104. The arrangement of the backplane 112 in the present invention is different from conventional arrangements in which the backplane is an integral part of the motherboard. In general, the motherboard 110 contains the necessary components to allow the modular computer system 100 to operate but does not include the backplane 112. These components may be, but are not limited to, a computer processing unit socket, a computer processing unit connected to the socket, a computer processing unit fan and heat sink mount, a computer processing unit fan connector, memory slots, ATX power connected, IDE connected, BIOS flash chip socket, south bridge, CMOS backup battery, integrated audio codec chip, integrated gigabit Ethernet chip, connected for integrated peripherals, Northbridge, and the like. The backplane 112 has at least one SATA slot positioned relative to the slot 108 to allow the connection between a hard drive 106 and the backplane 112. In the shown embodiment, the backplane 112 has three (3) forward facing SATA ports. In additional embodiments, the backplane 112 can have additional SATA ports on the front, top, or rear of the backplane 112. Notably, sufficient space is allowed between the components to permit efficient cooling and air flow throughout the interior of the modular computer system 100.

Figure 7:
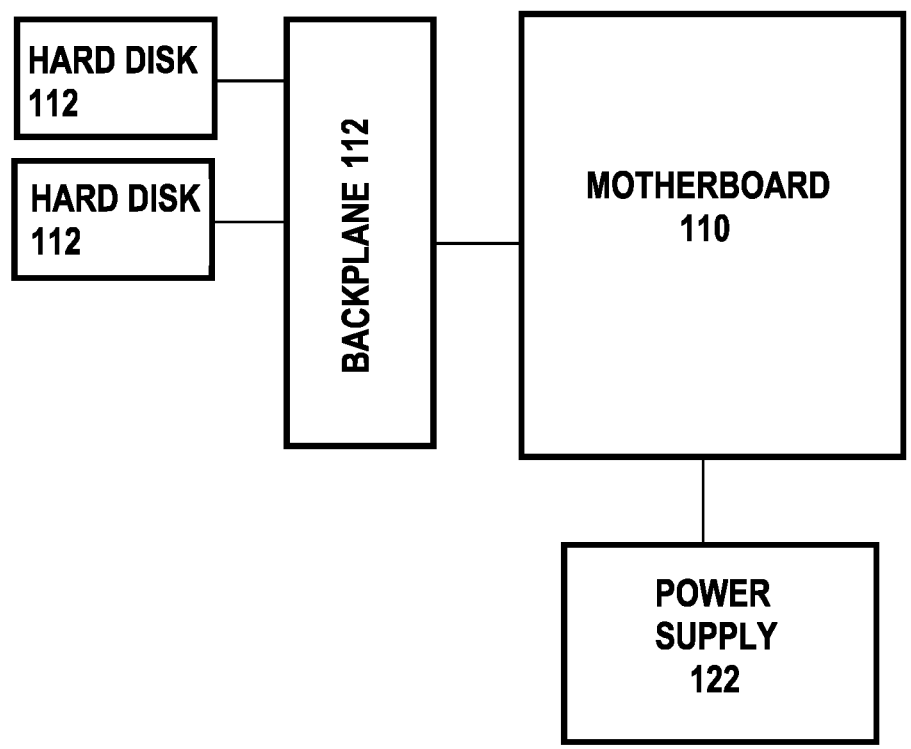
FIG. 7 illustrates a block diagram showing the electrical connections among the major components of the modular computer system.

FIG. 7 illustrates a block diagram showing the electrical connections among the major components of the modular computer system 100. As shown, the major components include the power supply 122, the motherboard 110, the backplane 112, and one or more hard drives 106. The hard drives 106 can be removed from the device by pulling each one out.

Figure 8:
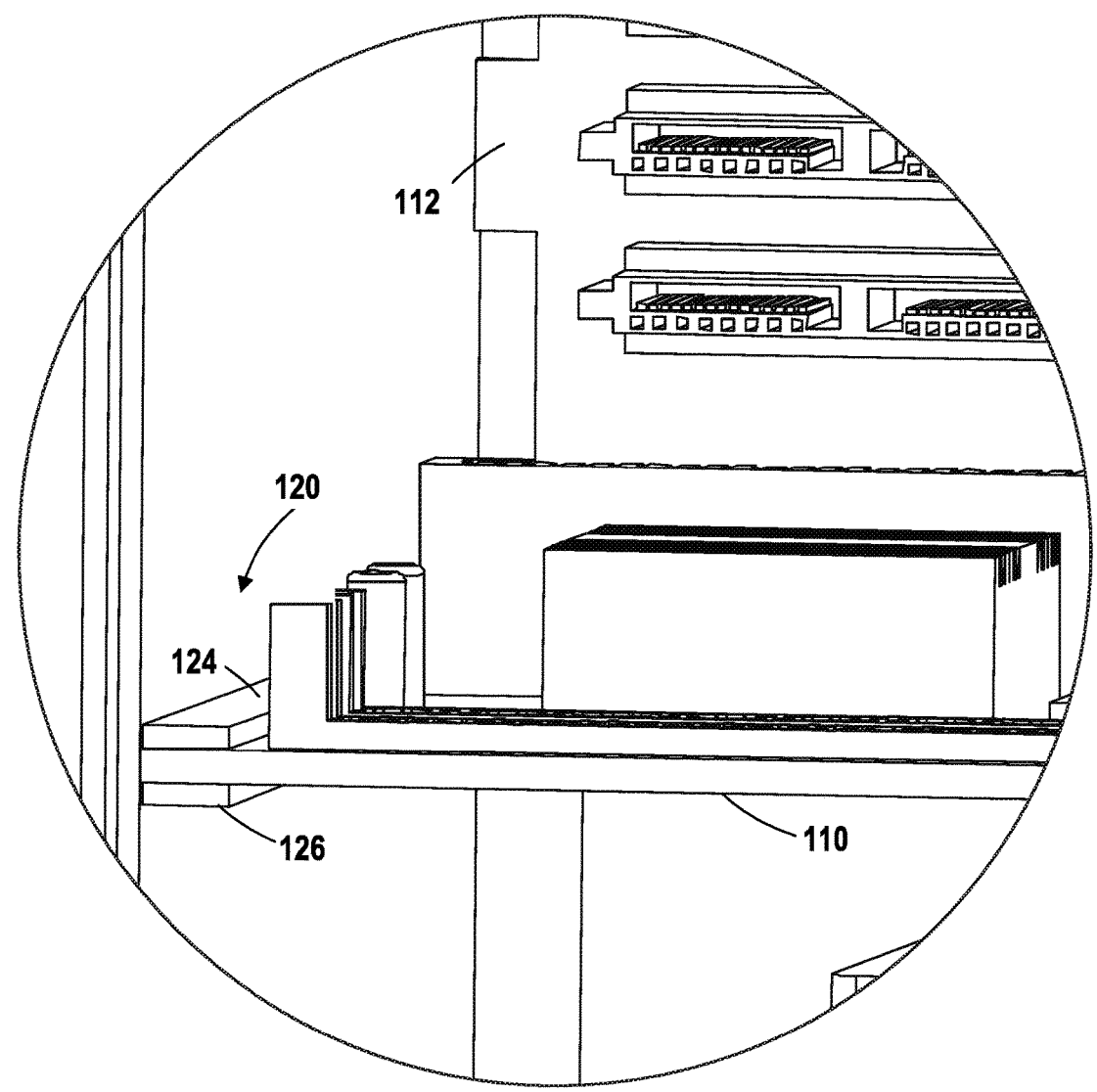
FIG. 8 illustrates a close-up view of the slide-out motherboard installed.

FIG. 8 illustrates a close-up view of the motherboard 110 installed in the slide grooves 120. The slide groove 120 are each shown having an upper portion 124 and a lower portion 126. The upper portion 124 and the lower portion 126 are positioned apart from one another to allow for the motherboard 110 to securely fit between the upper portion 124 and the lower portion 126 of the slide groove 120. The distance between the upper portion 124 and the lower portion 126 is predetermined based on the thickness of the motherboard 110. In additional embodiments, the predetermined distance incorporates the thickness of any and all coatings that are applied to the interior surfaces of the upper portion 124 and the lower portion 126. The upper portion 124 and the lower portion 126 extend a predetermined distance from the inside wall of the casing 102. The distance the upper portion 124 and the lower portion 126 extend from the interior surface of the casing 102 is based on the motherboard 102 components, so that the upper portion 124 and the lower portion 126 do not interfere with the motherboard 110. In the shown embodiment, the motherboard 110 is secured in the slide grooves 120 on both sides of the casing 102. The slide groove(s) 120 adequately secures the motherboard 110 from vibration while in use or other movement that would result in a decreased performance, or component damage. In one embodiment, the interior cavities of the slide groove(s) 120 are coated with a vibration absorbing coating. In some embodiments, other coatings can be used to coat the slide groove(s) 120 to improve the stability and anti-vibration of the motherboard 110. In some embodiments, the slide grooves 120 may have tool-less locking devices to further secure the motherboard 110.

Figure 9:
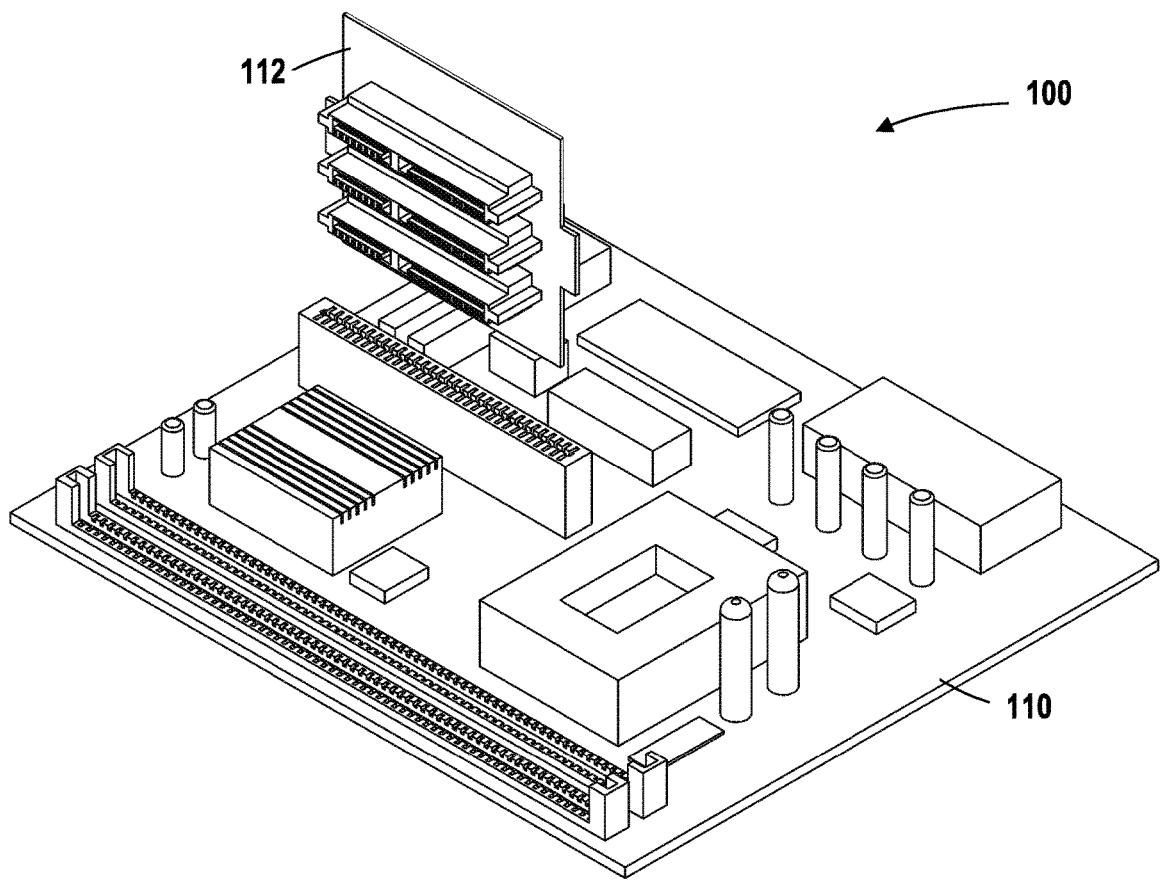
FIG. 9 illustrates a section view of the modular computer system internals.

FIG. 9 illustrates a section view of the modular computer system 100. This illustration shows the motherboard 110 and the backplane 112 when in the installed position. The tray 104 when installed covers a SATA port of the backplane 112 to allow for easy connection of a hard drive or component with a SATA connection.

Figure 10:
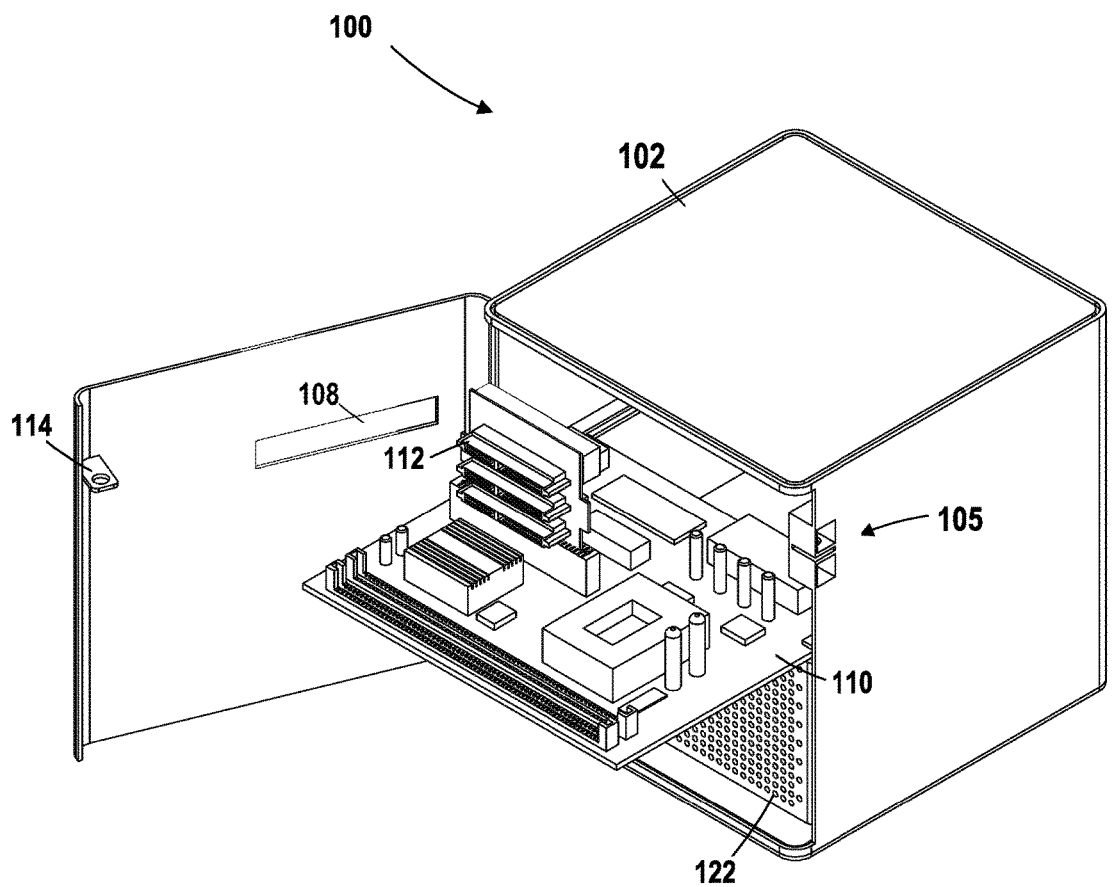
FIG. 10 illustrates a view of interior with the motherboard slid out for servicing.

FIG. 10 illustrates a view of interior of the modular computer system 100 with the motherboard 110 slid out.

While this invention has been described in conjunction with the various exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

The invention claimed is:

1. A modular computer system, comprising:
    a casing, wherein the casing is an enclosed structure having an exterior and an interior;
    a door attached to the casing allowing access to the interior of the casing;
    in the interior of the casing,
    (a) a pair of slide grooves,
    wherein each one of the slide grooves is disposed along opposite interior walls of the casing;
    (b) a motherboard, wherein lateral edges of the motherboard are disposed in the slide grooves;
    (c) a backplane disposed on the motherboard and arranged substantially perpendicular to the motherboard having at least one port connected to the motherboard;

(d) wherein the slide grooves permit an assembly including only the motherboard along with the backplane attached thereto to slide out from the interior of the casing through the door; and (e) a power supply electrically connected to the motherboard;

in the exterior of the casing, an opening permitting at least one hard drive to be freely inserted through the opening so that the hard drive extends into the interior and electrically connects it with the backplane such that the hard drive is substantially parallel with the motherboard while being substantially perpendicular with the backplane;

wherein the opening further permits the hard drive to be freely removed therefrom by pulling the hard drive without interference from any device inhibiting the pulling; and wherein such free insertion and removing of the hard drive is capable of being done during operation of the modular computer system when fully assembled.

2. The modular computer system of claim 1, wherein the backplane has at least one a Serial ATA (SATA) port.

3. The modular computer system of claim 1, wherein the powers supply is located in a separate compartment in the interior of the casing.

4. The modular computer system of claim 1, wherein the opening further includes a tray.

5. The modular computer system of claim 4, wherein the tray includes vibration suppression material.

6. The modular computer system of claim 5, wherein the tray is a sleeve permitting a hard drive to be inserted through the sleeve.

7. The modular computer system of claim 1, further comprising at least one other opening in the exterior permitting another hard drive to be inserted through that opening so as to extend into the interior to electrically connect it with the backplane.

8. The modular computer system of claim 7, wherein the opening further includes a tray.

* * * * *